March 22, 1960 W. E. STALHUTH 2,929,301
APPARATUS FOR CLAMPING ADVANCING ARTICLES
Filed Nov. 27, 1957 2 Sheets-Sheet 1

INVENTOR.
W.E. STALHUTH
BY
A.C. Schwarz, Jr.
ATTORNEY

March 22, 1960   W. E. STALHUTH   2,929,301
APPARATUS FOR CLAMPING ADVANCING ARTICLES
Filed Nov. 27, 1957   2 Sheets-Sheet 2

INVENTOR.
W. E. STALHUTH
BY a.c. Schwarz, Jr.
ATTORNEY

United States Patent Office 2,929,301
Patented Mar. 22, 1960

2,929,301

APPARATUS FOR CLAMPING ADVANCING ARTICLES

William E. Stalhuth, Euclid, Ohio, assignor to Western Electric Company, Incorporated, New York, N.Y., a corporation of New York Application November 27, 1957, Serial No. 699,299

6 Claims. (Cl. 90—20)

The present invention relates to apparatus for clamping advancing articles, and more particularly to apparatus for clamping in succession a plurality of workpieces and for presenting the clamped workpieces to a work station.

In the manufacture of telephone plugs, it is necessary to perform several profiling operations by means of milling machines in order to convert short lengths of brass tubing into the plug bodies. It is desirable to place the brass tubes on the periphery of a rotary table, which presents them in succession to a fixed work station, at which a milling machine is located. Since the dimensions of the finished plugs must be held within close limits, the tubes must be positioned accurately and clamped positively while they are being worked upon by the milling machine.

An object, therefore, of the invention is to provide new and improved apparatus for clamping advancing articles.

Another object of the invention is to provide new and improved apparatus for clamping in succession a plurality of workpieces and for presenting the clamped workpieces to a work station.

A clamping apparatus according to invention forms a part of an apparatus for presenting workpieces to a work station, wherein a plurality of workpieces are supported in spaced relationship to each other as a supporting member, which is moved so that the supported workpieces are advanced in succession to the work station. A clamping apparatus, embodying certain features of the invention, may include a single movable clamping member designed for clamping successive workipeces to the supporting member during presentation of the workpieces to the work station.

In operation, the clamping member is extended by suitable means, into clamping engagement with a workpiece at a first position before the work station, at which point further member operates to move the clamping means, while extended into clamping engagement with the workpiece, from the first position, past the work station, to a second position after the work station. At the second position, means operate to retract the clamping member out of clamping engagement with the finished workpiece and then means operate to move the retracted clamping member against the direction of movement of the workpiece-supporting member from the second position back to the first position, whereupon the extending means operate again to extend the clamping member into clamping engagement with the next successive workpiece.

Other objects and advantages of the invention will appear from the following detailed description of a specific embodiment thereof, when read in conjunction with the appended drawings, in which.

Figure 1:
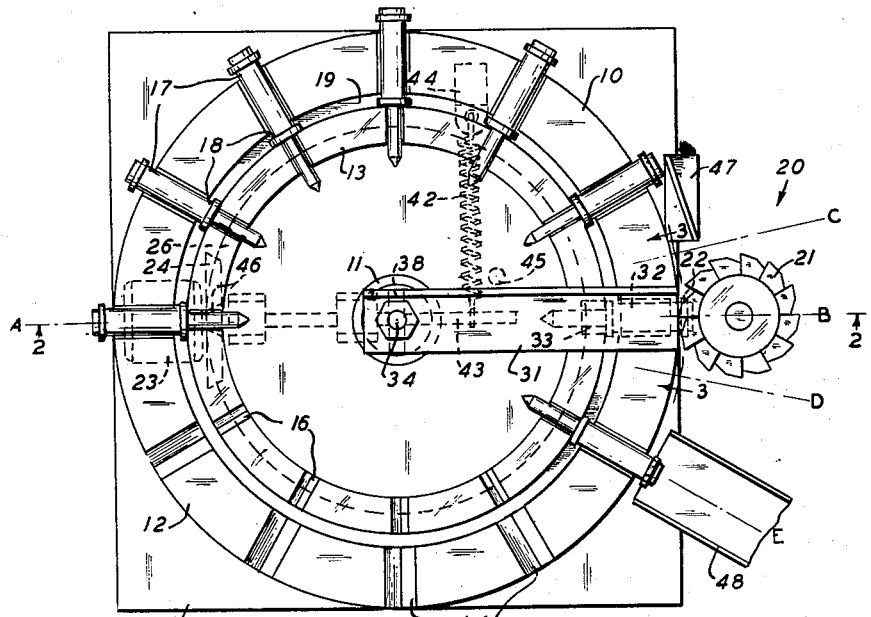
Fig. 1 is a top plan view of apparatus embodying the invention.
Figure 2:
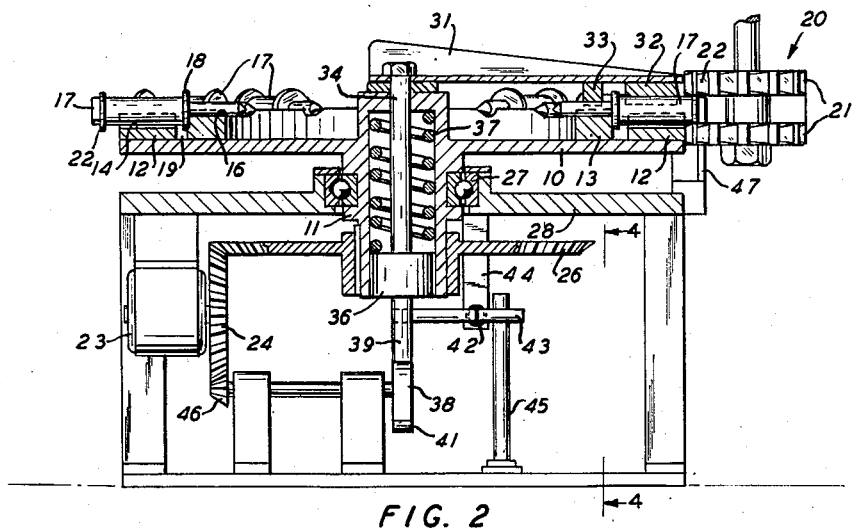
Fig. 2 is a vertical section taken substantially along the line 2—2 of Fig. 1.

Referring now to the drawings and in particular to Figs. 1 and 2 thereof, a circular table 10 is provided, mounted in a horizontal plane for rotation on a rotatable vertical sleeve 11. The table 10 is provided, near its periphery, with a pair of spaced, concentric article-supporting rings 12 and 13, extending upward from the surface of the table 10, as seen in Fig. 2.

Figure 3:
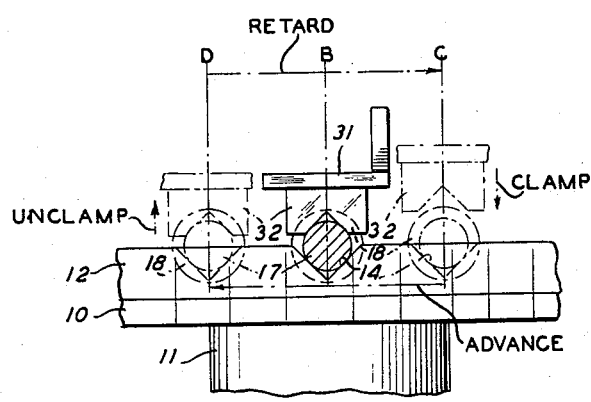
Fig. 3 is an enlarged, fragmentary, vertical section taken substantially along the line 3—3 of Fig. 1, and illustrating the operation of the clamping means.

The outer supporting ring 12 is formed with a plurality of V-shaped, radially extending grooves 14—14, best seen at the bottom of Fig. 1 and in Fig. 3, at equally spaced intervals along the upper surface thereof, designed for supporting portions of a workpiece. The inner supporting ring 13 is provided with an equal plurality of V-shaped grooves 16—16, which are in radial alignment with the V-shaped grooves 14—14 of the outer ring 12 and are designed for supporting other portions of the workpiece.

The aligned pairs of article-supporting grooves 14—14 and 16—16 are designed for receiving and supporting a plurality of workpieces, which may be partly formed, generally cylindrical telephone plugs 17—17. Each successive plug 17 to be worked on is placed, at a feed station A indicated in Fig. 1, into supporting relationship with an aligned pair of the V-shaped grooves 14 and 16.

The plug 17 is so placed that portions of a circular flange 18, intermediate between the ends of the plug 17, extend downward within an annular channel 19 defined between the raised spaced rings 12 and 13, as seen in Fig. 2. The plug 17 is thus supported loosely between the spaced rings 12 and 13 so that it may be advanced, upon rotation of the table 10, from the feed station A, 180° in a clockwise direction, as viewed in Fig. 1, to a work station B.

The work station B may be a milling machine, designated generally by the numeral 20, having a pair of horizontal, spaced, rotary cutters 21—21. With the shoulder 18 extending into the annular channel 19, portions of the plug 17 protrude radially outward a predetermined distance beyond the outer periphery of the outer ring 12, so that an outer circular flange 22 of the plug 17 is carried between the cutters 21—21, which remove slices from both the upper and the lower portions of the flange 22. The cut produced by this milling operation is termed a straddle cut. The straddle-cut flange 22 is at the rear end of the finished telephone plug and prevents rotation of the plug within a suitable holder therefor.

The table 10 is rotated at a constant speed by a suitable motor 23, which rotates a drive gear 24 in mesh with a ring gear 26, keyed to the rotatable sleeve 11. The sleeve 11 is journalled in a suitable bearing 27 for rotation with respect to a fixed support 28, as best seen in Fig. 2.

Prior to the milling operation, each successive plug 17 to be milled is clamped securely between its associated supporting grooves 14 and 16 and a movable clamping arm 31. The clamping arm 31 is mounted centrally with respect to the table 10 for both vertical reciprocation and horizontal oscillation with respect thereto. The clamping arm 31 extends radially outward from its mounting at the center of the table 10 to the periphery thereof.

A pair of spaced, V-grooved clamping jaws 32 and 33 depend from the clamping arm 31 in aligned relationship with respect to the supporting rings 12 and 13, respectively. The clamping jaws 32 and 33 are designed to fit closely about upper portions of the plug 17 to be milled, thereby clamping the plug 17 down against the corresponding plug-supporting grooves 14 and 16 during the milling operation, as best seen in Figs. 2 and 3.

The inner end of the clamping arm 31 is mounted on an oscillatable and reciprocable vertical shaft 34, which extends axially downward within the rotating sleeve 11. An enlarged portion 36 of the shaft 34 fits closely within lower portions of the rotating sleeve 11, the entire shaft 34 being reciprocable vertically within the rotating sleeve 11 to raise and lower the clamping arm 31 at predetermined intervals into and out of clamping engagement with a plug 17 to be milled.

As shown in Fig. 2, the clamping arm 31 is normally urged downward by a biasing spring 37, mounted in the annular space between the shaft 34 and the rotating sleeve 11 and extending between the upper inner portion of the sleeve 11 and the enlarged portion 36 of the shaft 34. In this lowered position, the clamping arm 31 is urged downward by the biasing spring 37 so that the clamping jaws 32 and 33 will clamp securely the plug 17 to be milled against the plug supporting grooves 14 and 16 during the cutting operation.

Figure 4:
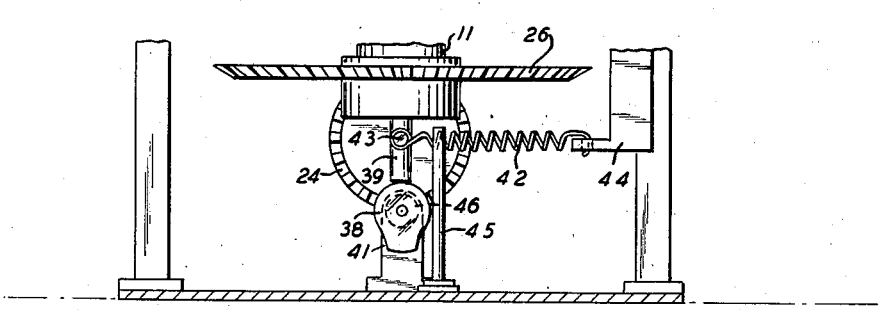
Fig. 4 is a fragmentary, vertical section taken substantially along the line 4—4 of Fig. 2.

When the clamping arm 31 is in its lowered or clamping position, suitable means operate to move the clamping arm 31 with the rotating table 10 and the plug 17 from a first position or clamping station C, past the milling station B, to a second position or an unclamping station D, as viewed in Fig. 1. The clamping arm 31 is shown in phantom lines in Fig. 3 at the clamping station C and at the unclamping station D, before and after, respectively, the milling station B. It has been found that the clamping engagement between the jaws 32 and 33 and the plug 17 is enough to cause rotation of the supporting shaft 34 to carry the clamping arm through the desired arc. Obviously independent drive means could be used to accomplish this movement, such as an intermittently operating clutch designed for connecting the shaft 34 to the rotating sleeve 11 during the desired time interval. At the unclamping station D, the clamping arm 31 is elevated by a rotary cam 38 a distance sufficient for the jaws 32 and 33 to clear the plug 17. As seen in Figs. 2 and 4, a depending portion 39 of the shaft 34 is pushed upward, against the action of the biasing spring 37, by an apex 41 of the cam 38.

After the cam 38 has elevated the clamping arm 31, a return spring 42 becomes free to rotate the shaft 34, and thus the clamping arm 31, against the direction of rotation of the table 10 from the unclamping station D back to the clamping station C. The return spring 42 is secured between a horizontal lever 43, projecting from the bottom of the shaft 34, and a fixed support 44 and will rotate the shaft 34 in a counterclockwise direction, as viewed in Fig. 1, until the lever 43 strikes a fixed stop 45, positioned in radial alignment with the clamping station C.

As the elevated clamping arm 31 is moved to the clamping station C, the depending portion 39 of the shaft 34 will ride off of the apex 41 of the cam 38, to lower the clamping arm 31 under the urging of the spring 37 from its elevated position into clamping engagement with the next successive plug 17, thus completing a full cycle of operation.

The cam 38 is driven in predetermined synchronization with the speed of the table 10, so that the cam 38 makes one revolution, completing one cycle of operation, as the table 10 rotates a fraction of its circumference equal to the spacing between successive plugs 17—17. The cam 38 may be driven at this faster speed by means of a small gear 46 in mesh with the driving gear 24 for the table 10.

In the example shown, there are twelve plug-supporting grooves, spaced at 30° intervals around the periphery of the rotating table 10, therefore, the cam 38 is designed to rotate at twelve times the speed of the table 10 in order to complete one cycle of operation for each successive advancement of a plug 17 to the milling machine 21.

A fixed wiper 47 is mounted circumferentially before the clamping station C to nudge each advancing plug 17 radially inward so that the intermediate shoulder 18 abuts the outer periphery of the inner ring 13, which is the proper radial position for the milling operation.

A discharge chute 48 is mounted at a discharge station E, beyond the unclamping station D, for receiving the succession of milled plugs 17—17.

*Operation*

In operation, a succession of the plugs 17—17 to be milled are placed in position between aligned pairs of the advancing, supporting grooves 14—14 and 16—16, so that the intermediate shoulders 18—18 fit loosely within the annular channel 19. The plugs 17—17 are so introduced at the feed station A, either manually or by suitable automatic means (not shown).

The supported plugs 17—17 are then advanced by the rotating table 10, in a clockwise direction as viewed in Fig. 1, from the feed station A to a position short of the clamping station C, whereat the wiper 47 nudges the advancing plugs 17—17 radially inward so that the shoulders 18—18 contact the outer periphery of the inner ring 13, thereby positioning them properly for presentation to the milling machine 21.

At the clamping station C, while the plug 17 to be milled is still in contact with the wiper 47, the previously elevated clamping arm 31 is lowered into clamping engagement with the plug 17, the clamping jaws 32 and 33 firmly engaging and clamping spaced portions of the plug 17 to be milled against the supporting grooves 14 and 16 in the rings 12 and 13, respectively, as indicated by the arrow designated "clamp" in Fig. 3. The clamping arm 31 is so lowered by the biasing spring 37 when the depending portion 39 of the shaft 34 rides off of the apex 41 of the cam 38.

The shaft 34 is then rotated with the rotating sleeve 11, against the action of the return spring 42, due to the firm contact between the clamping jaws 32 and 33 and the plug 17. As previously indicated, independent drive means such as an intermittently operating clutch might be provided, if necessary, to accomplish or assist in accomplishing this movement. In this manner, the table 10, the clamped plug 17 and the clamping arm 31 advance together, as indicated by the arrow designated "advance" in Fig. 3, to carry the outer flange 22 of the plug 17 into cutting position with respect to the cutters 21—21 of the milling machine 20 at the work station B. The cutters 21—21 remove slices from the upper and lower portions of the outer flange 22 of the plug 17, producing the desired straddle cut.

The milled plug 17 and the clamping arm 31 are further rotated to the unclamping station D, circumferentially after the work station B, whereat the clamping arm 31 is elevated, as indicated by the arrow designated "unclamp" in Fig. 3, to a position above the milled plug 17. The elevation of the clamping arm 31 is accomplished when the depending portion 39 of the shaft 34 is pushed upward by the apex 41 of the cam 38.

Upon elevation of the clamping arm 31, the driving connection between the clamping arm 31 and the table 10 is removed, and the clamping arm 31 is then returned by the return spring 42 to the clamping station C, as indicated by the arrow designated "retard" in Fig. 3, so that it may again be lowered by the biasing spring 37 to clamp the next succeeding plug 17 for eventual presentation to the milling machine 21.

The unclamped, milled plug 17 is further advanced by the rotating table to the discharge station E, whereat it is discharged either manually or by suitable automatic means (not shown) into the discharge chute 48.

It will be manifest that this invention is not limited to the specific details described in connection with the above embodiment of the invention, but that various modifications may be made without departing from the spirit and scope thereof.

What is claimed is:

1. In an apparatus for presenting workpieces to a work station, wherein a plurality of workpieces are supported in spaced relationship to each other on a supporting member, which is moved so that the supported workpieces are advanced in succession to the work station; an improved clamping apparatus, which comprises a single movable clamping member designed for clamping successive workpieces to the supporting member during presentation of the workpieces to the work station, means for extending said clamping member into clamping engagement with a workpiece at a first position before the work station, means for moving said clamping member, while extended into clamping engagement with the workpiece, from the first position, past the work station, to a second position after the work station, means for retracting said clamping member out of clamping engagement with the finished workpiece at the second position, and means for moving said retracted clamping member against the direction of movement of the workpiece-supporting member from the second position back to the first position, whereupon said extending means operate again to extend said clamping member into clamping engagement with the next successive workpiece.

2. In an apparatus for presenting workpieces to a work station, wherein a plurality of workpieces are supported in spaced relationship to each other on a supporting member, which is moved so that the supported workpieces are advanced in succession to the work station; an improved clamping apparatus, which comprises a single movable clamping arm, means for urging said clamping arm to a first position before the work station, means for extending said clamping arm into clamping engagement with a workpiece at the first position, the clamping engagement between said clamping arm and the workpiece causing said clamping arm to move with the supporting member and the advancing workpiece and against the action of said urging means from the first position, past the work station, to a second position after the work station, and means for retracting said clamping arm out of clamping engagement with the finished workpiece at the second position, whereupon said urging means operate to return said clamping arm to the first position.

3. In an apparatus for presenting workpieces to a work station, wherein a plurality of workpieces are supported at spaced intervals around the periphery of a rotary circular table, which is mounted in a horizontal plane adjacent to the work station and is rotated so that the workpieces are presented in succession to the work station; an improved clamping apparatus, which comprises a single movable clamping member designed for clamping successive workpieces to the table during the presentation of the workpieces to the work station by the rotating table, said clamping member being mounted centrally with respect to the table for both vertical reciprocation and horizontal oscillation with respect thereto, means for lowering said clamping member into clamping engagement with a workpiece on the table at a first position circumferentially before the work station, means for moving said clamping member while lowered into clamping engagement with the workpiece in the direction of rotation of the table from the first position, past the work station, to a second position circumferentially after the work station, means for elevating said clamping member out of clamping engagement with the finished workpiece at the second position, and means for returning said elevated clamping member against the direction of rotation of the table from the second position back to the first position, whereupon said lowering means operate again to lower said clamping member into clamping engagement with the next successive workpiece.

4. In an apparatus for presenting workpieces to a work station, wherein a plurality of workpieces are supported at spaced intervals around the periphery of a rotary circular table, which is mounted in a horizontal plane adjacent to the work station and is rotated so that the workpieces are presented in succession to the work station; an improved clamping apparatus, which comprises a rotatable and vertically reciprocable vertical shaft disposed centrally with respect to the table, a clamping arm mounted on said shaft, a horizontal lever secured to a lower portion of said shaft, a stop for said lever, a fixed support, a return spring secured between said horizontal lever and said fixed support, said return spring being designed for rotating said shaft against the direction of rotation of the table until said lever contacts said stop at which position said clamping arm is at a first position circumferentially before the work station, means for lowering said shaft and said clamping arm into clamping engagement with a workpiece on the table at the first position, the clamping engagement between said clamping arm and the workpiece causing the lowered clamping arm to move with the table and the workpiece in the direction of rotation of the table from the first position, past the work station, to a second position circumferentially after the work station, thereby rotating said shaft against the action of said return spring, and means for elevating said shaft and said clamping arm out of clamping engagement with the finished workpiece at the second position, whereupon said return spring operates to return said elevated clamping arm to the first position.

5. In an apparatus for presenting workpieces to a work station, wherein a plurality of workpieces are supported at spaced intervals around the periphery of a rotary circular table, which is mounted in a horizontal plane adjacent to the work station and is rotated so that the workpieces are presented in succession to the work station; an improved clamping apparatus, which comprises a rotatable and vertically reciprocable vertical shaft disposed centrally with respect to the table, a clamping arm mounted on said shaft, a biasing spring designed for urging said shaft to a lowered position whereat said clamping arm is in clamping engagement with a workpiece on the table, and rotating with the table from a first position circumferentially before the work station, past the work station, to a second position circumferentially after the work station, a rotatable cam mounted beneath the bottom of said shaft and having an apex designed for pushing up on the bottom of said shaft against the action of said biasing spring to elevate said clamping arm out of clamping engagement with the finished workpiece at the second position, means for rotating the elevated shaft and said elevated clamping arm against the direction of rotation of the table from the second position to the first position, whereupon the apex of said cam rides out from under the bottom of said shaft and said biasing spring operates to lower said shaft and said clamping arm into clamping engagement with the next successive workpiece, and means for synchronizing the speed of rotation of said cam with the speed of rotation of the table so that said cam completes one revolution each time the table advances a portion of its circumference equal to the spacing between successive workpieces.

6. In an apparatus for presenting workpieces to a work station, wherein a plurality of workpieces are supported at spaced intervals around the periphery of a rotary circular table, which is mounted in a horizontal plane adjacent to the work station and is rotated so that the workpieces are presented in succession to the work station; an improved clamping apparatus, which comprises a rotatable and vertically reciprocable vertical shaft disposed centrally with respect to the table, a clamping arm mounted on said shaft, a horizontal lever secured to a lower portion of said shaft, a stop for said lever, a fixed support, a return spring secured between said horizontal lever and said fixed support, said return spring being designed for rotating said shaft against the direction of rotation of the table until said lever contacts said stop at which position said clamping arm is at a first position circumferentially before the work station, a biasing spring designed for urging said shaft to a lowered position whereat said clamping arm is in clamping engagement with a workpiece on said table at the first position, the clamping engagement between said clamping arm and the workpiece causing the lowered clamping arm to move with the table and the workpiece in the direction of rotation of the table from the first position, past the work station, to a second position circumferentially after the work station, thereby rotating said shaft against the action of said return spring, a rotatable cam mounted beneath the bottom of said shaft and having an apex designed for pushing up on the bottom of said shaft against the action of said biasing spring to elevate said clamping arm out of clamping engagement with the finished workpiece at the second position, whereupon said return spring operates to return said elevated clamping arm to the first position, at which point the apex of said cam rides out from under the bottom of said shaft and said biasing spring operates to lower said shaft and said clamping arm into clamping engagement with the next successive workpiece, and means for synchronizing the speed of rotation of said cam with the speed of rotation of the table so that said cam completes one revolution each time the table advances a portion of its circumference equal to the spacing between successive workpieces.

References Cited in the file of this patent
UNITED STATES PATENTS

| | | |
|---|---|---|
| 2,028,225 | Larson | Jan. 21, 1936 |
| 2,202,082 | Berkstresser | May 28, 1940 |
| 2,767,623 | Hanson | Oct. 23, 1956 |